United States Patent
Cho et al.

(10) Patent No.: US 8,325,594 B2
(45) Date of Patent: Dec. 4, 2012

(54) APPARATUS AND METHOD FOR TRANSMITTING/RECEIVING UPLINK PILOT IN FREQUENCY DIVISION MULTIPLE ACCESS SYSTEM

(75) Inventors: Yun-Ok Cho, Suwon-si (KR); Ju-Ho Lee, Suwon-si (KR); Joon-Young Cho, Suwon-si (KR); Hee-Don Gha, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 648 days.

(21) Appl. No.: 11/917,450

(22) PCT Filed: Jun. 21, 2006

(86) PCT No.: PCT/KR2006/002394
§ 371 (c)(1),
(2), (4) Date: Dec. 13, 2007

(87) PCT Pub. No.: WO2006/137693
PCT Pub. Date: Dec. 28, 2006

(65) Prior Publication Data
US 2010/0149962 A1    Jun. 17, 2010

(30) Foreign Application Priority Data
Jun. 21, 2005   (KR) ................................ 53746/2005

(51) Int. Cl.
*H04J 11/00* (2006.01)
(52) U.S. Cl. ........ 370/210; 370/345; 370/468; 375/269; 375/295
(58) Field of Classification Search .................. 370/210, 370/344, 345, 468; 375/295, 269, 324, 346, 375/340; 714/784
See application file for complete search history.

(56) References Cited

U.S. PATENT DOCUMENTS

| | | | |
|---|---|---|---|
| 7,508,842 B2 * | 3/2009 | Baum et al. | 370/468 |
| 2003/0026357 A1 * | 2/2003 | Bartlett et al. | 375/324 |
| 2003/0048808 A1 | 3/2003 | Stahl et al. | 370/487 |

(Continued)

FOREIGN PATENT DOCUMENTS

EP    1283607 B1    11/2005

(Continued)

OTHER PUBLICATIONS

Dong et al., Optimal Pilot Interval Design for Channel Estimation, The 14$^{th}$ IEEE 2003 International Symposium on Personal, Indoor and Mobile Radio Communication Proceedings, 2003.

(Continued)

*Primary Examiner* — Habte Mered
*Assistant Examiner* — Vincelas Louis
(74) *Attorney, Agent, or Firm* — The Farrell Law Firm, P.C.

(57) ABSTRACT

Method and apparatus for transmitting/receiving an uplink pilot used for channel estimation and measurement of an uplink in an FDMA system. Pilot symbols are transmitted with different frequency mapping patterns in first and second pilot symbol intervals of one time slot interval including data symbol intervals and the inconsecutive first and second pilot symbol intervals which have a shorter length than the data symbol intervals. As a result, interpolation of a frequency domain during channel estimation is not necessary, and can correctly obtain channel-estimated values of a frequency at which data is transmitted, in a fast time-varying channel environment.

32 Claims, 20 Drawing Sheets

U.S. PATENT DOCUMENTS

| | | | |
|---|---|---|---|
| 2004/0081123 | A1 | 4/2004 | Krishnan et al. |
| 2005/0068931 | A1* | 3/2005 | Cho et al. ............... 370/345 |
| 2005/0084035 | A1* | 4/2005 | Kim et al. ............... 375/295 |
| 2005/0094550 | A1 | 5/2005 | Huh et al. |
| 2006/0062320 | A1* | 3/2006 | Luz et al. ............... 375/269 |
| 2006/0184862 | A1* | 8/2006 | Kim et al. ............... 714/784 |
| 2010/0014487 | A1* | 1/2010 | Attar et al. ............... 370/335 |
| 2010/0054371 | A1* | 3/2010 | Namgoong et al. ........ 375/340 |
| 2010/0220825 | A1* | 9/2010 | Dubuc et al. ............... 375/346 |

FOREIGN PATENT DOCUMENTS

| | | |
|---|---|---|
| KR | 1020050041804 | 5/2005 |
| KR | 1020050051865 | 6/2005 |
| WO | WO 2005/053198 | 6/2005 |

OTHER PUBLICATIONS

Written Opinion of the International Searching Authority (PCT/ISA/237) (3 pages) from PCT/KR2006/002394.

International Search Report (PCT/ISA/210) (3 pages) from PCT/KR2006/002394.

PCT/ISA/220 (3 pages) from PCT/KR2006/002394.

* cited by examiner

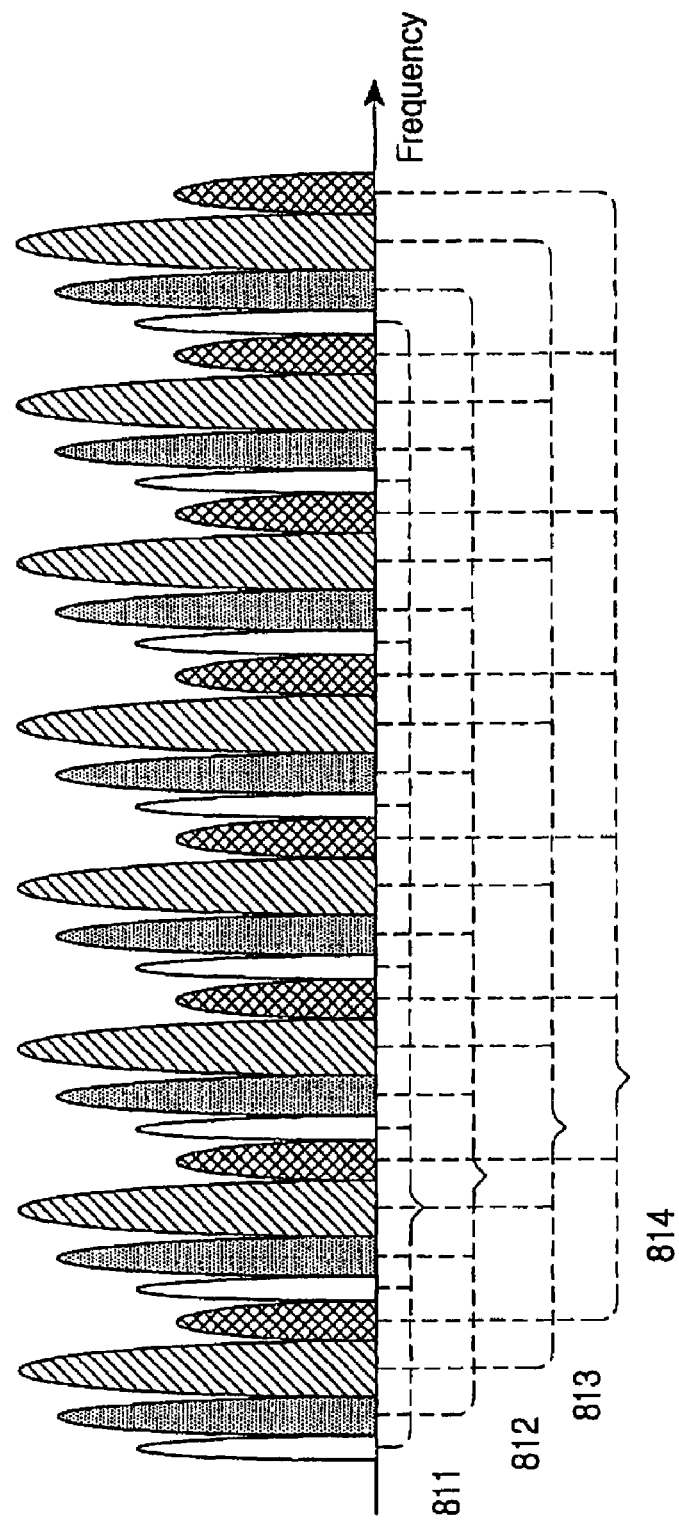

APPARATUS AND METHOD FOR TRANSMITTING/RECEIVING UPLINK PILOT IN FREQUENCY DIVISION MULTIPLE ACCESS SYSTEM

BACKGROUND OF THE INVENTION

1. Field of the Invention

The present invention relates generally to a Frequency Division Multiple Access (FDMA) system, and in particular, to a method and apparatus for transmitting/receiving uplink pilots used for channel estimation and measurement of an uplink.

2. Description of the Related Art

The next generation mobile communication system uses Distributed Frequency Division Multiple Access (DFDMA) and Localized Frequency Division Multiple Access (LFDMA) as a useful uplink multiple access scheme. In the uplink, an increase in Peak to Average Power Ratio (PAPR) causes performance degradation due to linear characteristics of a power amplifier of a transmitter, or terminal, resulting in a reduction in cell coverage. Compared with the system using multiple carriers, DFDMA and LFDMA, as they both use a single carrier, are advantageous in that they can solve the PAPR problem.

In the wireless mobile communication system where channel characteristics undergo a change in time and frequency domains, proper pilot signals are transmitted along with data signals to make it possible to perform channel estimation necessary for demodulating the data signals. A system employing DFDMA/LFDMA generally uses a Time Division Multiplexing (TDM) format that distinguishes between data signals and pilot signals in the time domain before transmission, in order to maintain the preferred PAPR characteristic.

FIG. 1 illustrates typical TDM-formatted data signals and pilot signals.

Referring to FIG. 1, reference numeral 110 represents one time slot including one transmission time interval (TTI) or a plurality of TTIs. As the most general TDM format, a plurality of time symbols 120 having a duration of the same length of time $T_d$ exist in the one time slot 110, and each of the time symbols 120 is allocated for transmission of a pilot signal or a data signal. To prevent inter-symbol interference, a guard period (or guard interval) 130 having a length of a time interval $T_g$ is inserted between time symbols 120.

With reference to FIGS. 2 and 3, a brief description will be made of a structure of a transmission apparatus for implementing a DFDMA/LFDMA system that transmits data signals and pilot signals in the stated-above TDM format.

FIGS. 2A to 2D illustrate a structure of a transmission apparatus for the typical DFDMA system. FIG. 2A and FIG. 2B illustrate a spectrum 200 in a frequency domain and a one-symbol signal format 210 in a time domain of the DFDMA system, respectively, and FIGS. 2C and 2D illustrate an exemplary transmission apparatus 220 in the time domain and an exemplary transmission apparatus 230 in the frequency domain of the DFDMA system, respectively.

Referring to FIG. 2A, the spectrum 200 in the frequency domain of the DFDMA system has a format in which C frequency elements 201 are spaced apart over the full band, and a set of C scattered frequency elements is called a comb 202, which is a resource allocation unit. If a distance between frequency elements in one comb 202 is defined as the number R of repetitions (hereinafter repetition R) 203, a value of the R 203 is equal to the total number of combs. If comb indexes of 1~R are sequentially assigned to the frequency elements beginning at the position of a first frequency element where each comb starts in the full band, the comb 202 is assigned a comb index of 2.

FIG. 2B illustrates a signal format 210 of a length-$T_d$ DFDMA data symbol in the time domain. If the basic time element is defined as a sample, a length of a sample interval 211 is $T_s$ and a reciprocal of the sample interval length is a sampling frequency. In a time-domain signal format of the DFDMA system, a block of C data symbols is repeated as many times as the repetition R defined in the spectrum 200. Because 4 data symbols of a, b, c and d are repeatedly transmitted R times for one data or pilot symbol interval $T_d$ 212, a relationship between the sample interval length $T_s$ 211 and the data/pilot symbol interval $T_d$ 212 is given as in Equation (1).

$$T_d = C \cdot R \cdot T_S \qquad (1)$$

A structure of a transmitter for generating a DFDMA transmission signal having the signal format 210 in the time and frequency domains will be described with reference to FIGS. 2C and 2D.

Referring to FIG. 2C, a transmission apparatus 220 in the time domain receives an input bit stream using a proper bit-to-constellation mapper 221, and outputs C data symbols. Exemplary bit-to-constellation mapping methods used in the bit-to-constellation mapper 221 include Quadrature Phase Shift Keying (QPSK), Quadrature Amplitude Modulation (QAM), etc. In addition, a pilot sequence generator 222 generates C pilot symbols.

Output symbols of the bit-to-constellation mapper 221 and the pilot sequence generator 222 are input to a selector 223, and the selector 223 selects one type of the symbols according to the current time symbol index. An output of the selector 223 is repeatedly output by a repeater 224 as many times as the repetition R, and then phase-shifted by a comb-specific phase shifter 225. A phase-shifted $i^{th}$ comb is expressed as in Equation (2).

$$S_l^{(i)} = \exp\left(-j \cdot l \cdot i \cdot \frac{2\pi}{R \cdot C}\right), \qquad (2)$$
$$l = 0, \ldots R \cdot C - 1$$

In Equation (2), l denotes a sample index described in FIG. 2B.

The signal phase-shifted by the comb-specific phase shifter 225 passes through a guard interval adder 226 to prevent inter-symbol interference, and then is transmitted over a wireless channel. The guard interval adder 226 can use any one or both of a zero-padding technique of transmitting no signal, and a cyclic prefix, as a guard interval.

FIG. 2D illustrates a transmission apparatus for implementing DFDMA that transmits data signals and pilot signals by TDM, in the frequency domain. A bit-to-constellation mapper 231, a pilot sequence generator 232 and a selector 233 of FIG. 2D are identical in operation to the bit-to-constellation mapper 221, the pilot sequence generator 222 and the selector 223 of FIG. 2C, so a description thereof will be omitted.

Referring to FIG. 2D, a pilot or data signal output from the selector 223 according to a symbol index is converted into a frequency-domain signal through a size-C Fast Fourier Transform (FFT) block 236. An output signal of the FFT block 234 is mapped to a size-C*R IFFT block 236, and mapping between the output of the FFT block 234 and the input to the IFFT block 236 is achieved by a comb-specific mapper 235.

The comb-specific mapper 235 differentiates a first IFFT input index for each individual comb while maintaining an interval at which the outputs of the FFT block 234 are input to the IFFT block 236 at the above-defined repetition R, thereby mapping the outputs of the FFT block 234 such that they should not overlap for each individual comb. Because mapping between the output of the FFT block 234 and the input to the IFFT block 236 is performed in the frequency domain, it can be noted that signals for each individual comb are coincide with the DFDMA frequency spectrum 200 described in FIG. 2A. The output of the IFFT block 236, which is a time-domain signal, passes through a guard interval adder 237, and then is transmitted over a wireless channel. The guard interval adder 217 adds a guard interval to the output of the IFFT block 236 in the manner of FIG. 2C before transmission.

The frequency spectrum 200 and the signal format 210 in the time-frequency domain and the transmission apparatuses 220 and 230 of the DFDMA system has been described so far with reference to FIGS. 2A to 2D. With reference to FIG. 3, a description will now be made of LFDMA. LFDMA can also be implemented by using the above-described spectrum, signal format and transmission apparatus and properly controlling the repetition R and the comb-specific phase shifting or comb-specific mapping. In the LFDMA system, because resources of the continuous frequency domain are allocated to a terminal, a domain of the continuous frequency elements that the terminal is allocated is defined as Region. FIG. 3A illustrates a frequency-domain spectrum 310 of the LFDMA system, and FIG. 3B illustrates an LFDMA transmission apparatus 320 in the frequency domain. A bit-to-constellation mapper 321, a pilot sequence generator 322, a selector 323, an FFT block 324, an IFFT block 326, and a guard interval adder 327 of FIG. 3B are equal in operation to the elements of FIG. 2C, so a description thereof will be omitted.

Because the frequency-domain spectrum 310 of the LFDMA system appears in the continuous frequency domain, it can be noted that a value of the repetition R is 1 and Region occupies a frequency range 312 including a set of C adjacent frequency elements. Region allocated to an $i^{th}$ terminal is distinguished according to initial start frequency Φ(i) 311. In addition, a range of the total frequency band includes $C_{total}$ 313 frequency elements.

In the LFDMA transmission apparatus 320 of FIG. 3B, a comb-specific mapper 325 continuously maps outputs of an FFT block 324 to C input nodes in sequence beginning at a $\Phi(i)^{th}$ input node of an IFFT block 326. Implementation of the LFDMA transmission apparatus 320 is possible by properly modifying mapping parameters for the transmission apparatus 230 in the frequency domain of the DFDMA system in this way. In this case, a size of the IFFT block 326 is $C_{total}$ corresponding to the total frequency band.

Similarly, it is also possible to implement the transmission apparatus of the LFDMA system by using the transmission apparatus 220 in the time domain of the DFDMA system. The apparatus has the structure shown in FIG. 2C, but the repetition R is 1 and the phase shifted by the comb-specific phase shifter 225 is set in accordance with Equation (3) below. In Equation (3), Φ(i) means an index of a frequency element where an $i^{th}$ Region starts in the full band.

$$p_l^{(i)} = \exp\left(-j \cdot l \cdot \phi(i) \cdot \frac{2\pi}{C_{total}}\right) \quad (3)$$

In Equation (3), a sample index l is an integer between 0 and RC−1.

Although the transmitter structure for one comb or Region has been described above, when a plurality of combs or Regions are used, extension to a transmission apparatus for multiple combs or Regions is possible by summing up the signals generated using a plurality of transmission apparatuses. Because this extension is obvious to those skilled in the art, it will be assumed in the following description that one terminal uses one comb/Region, for convenience.

The basic TDM pilot signal format means a format in which a plurality of time symbols having a length of the same time duration $T_d$ exist in one time slot as described in FIG. 1, and each of the time symbols is allocated for transmission of pilot or data. However, when a channel impulse response characteristic suffers a change even in one time slot due to the high moving velocity of the terminal, simply using one pilot symbol in one time slot is not sufficient to accurately estimate and measure channel characteristics. If several pilot symbols are used to solve this problem, pilot overhead increases resulting in a decrease in data transmission efficiency. Therefore, there is a need for a scheme for efficiently transmitting uplink pilots in a fast-varying channel environment without increasing the pilot overhead.

SUMMARY OF THE INVENTION

Accordingly, to substantially solve the problems of the prior art, the present invention provides an apparatus and method for efficiently transmitting and/or receiving an uplink pilot with less pilot overhead in an Frequency Division Multiple Access (FDMA) system.

The present invention provides an uplink pilot transmission and reception apparatus and method for using DFDMA and LFDMA in an uplink.

According to one aspect of the present invention, there is provided a method for transmitting an uplink pilot in a frequency division multiple access system. The method includes transmitting data symbols in data symbol intervals of one time slot including the data symbol intervals and inconsecutive first and second pilot symbol intervals which have a shorter length than the data symbol intervals; transmitting pilot symbols through a first set of frequency elements in the first pilot symbol interval; and transmitting the pilot symbols through a second set of frequency elements in the second pilot symbol interval.

According to another aspect of the present invention, there is provided a method for transmitting an uplink pilot in a frequency division multiple access system. The method includes transmitting data symbols for terminals in data symbol intervals of one time slot including the data symbol intervals and inconsecutive first and second pilot symbol intervals which have a shorter length than the data symbol intervals; transmitting first pilot symbols for a first terminal among the terminals through a first set of frequency elements in the first pilot symbol interval; and transmitting second pilot symbols for a second terminal among the terminals through the first set of frequency elements in the second pilot symbol interval.

According to further another aspect of the present invention, there is provided an apparatus for transmitting an uplink pilot in a frequency division multiple access system. The apparatus includes a bit-to-constellation mapper for generating data symbols; a pilot sequence generator for generating pilot symbols; a selector for selecting the data symbols in data symbol intervals of one time slot including the data symbol intervals and inconsecutive first and second pilot symbol intervals which have a shorter length than the data symbol intervals, and selecting the pilot symbols in the first and second pilot symbol intervals; and a mapper for mapping the data symbols to frequency elements given for data transmission in the data symbol interval before transmission, mapping the pilot symbols to a first set of frequency elements in the first pilot symbol interval before transmission, and mapping the pilot symbols to a second set of frequency elements in the second pilot symbol interval before transmission.

According to yet another aspect of the present invention, there is provided an apparatus for transmitting an uplink pilot in a frequency division multiple access system. The apparatus includes a bit-to-constellation mapper for generating data symbols; a pilot sequence generator for generating pilot symbols; a selector for selecting the data symbols in data symbol intervals of one time slot including the data symbol intervals and inconsecutive first and second pilot symbol intervals which have a shorter length than the data symbol intervals, and selecting the pilot symbols in the first and second pilot symbol intervals; and a mapper for mapping the data symbols to frequency elements given for data transmission in the data symbol interval before transmission, mapping the pilot symbols through a first set of frequency elements in the first pilot symbol interval before transmission, and waiting in the second pilot symbol interval without mapping the pilot symbols.

According to still another aspect of the present invention, there is provided an apparatus for receiving an uplink pilot in a frequency division multiple access system. The apparatus includes a divider for receiving a signal of one time slot including data symbol intervals and inconsecutive first and second pilot symbol intervals which have a shorter length than the data symbol intervals, distinguishing the received signal for each frequency element, and dividing the received signal into data symbols of the data symbol intervals and pilot symbols of the first and second pilot symbol intervals; a channel estimator for performing channel estimation using the pilot symbols; an equalizer for channel-compensating the data symbols using channel estimated values from the channel estimator; a demodulator for Orthogonal Frequency Division Multiplexing (OFDM)-demodulating the channel-compensated data symbols; and a constellation-to-bit mapper for converting the demodulated signal into a bit stream. The data symbols are mapped to given frequency elements in the data symbol intervals, the pilot symbols are mapped to a first set of frequency elements in the first pilot symbol interval, and the pilot symbols are mapped to a second set of frequency elements in the second pilot symbol interval.

According to still another aspect of the present invention, there is provided an apparatus for receiving an uplink pilot in a frequency division multiple access system. The apparatus includes a divider for receiving a signal of one time slot including data symbol intervals and inconsecutive first and second pilot symbol intervals which have a shorter length than the data symbol intervals, distinguishing the received signal for each frequency element, and dividing the received signal into data symbols of the data symbol intervals and pilot symbols of the first and second pilot symbol intervals; a channel estimator for performing channel estimation using the pilot symbols; an equalizer for channel-compensating the data symbols using channel estimated values from the channel estimator; a demodulator for Orthogonal Frequency Division Multiplexing (OFDM)-demodulating the channel-compensated data symbols; and a constellation-to-bit mapper for converting the demodulated signal into a bit stream. The data symbols for terminals are mapped to given frequency elements in the data symbol intervals, first pilot symbols for a first terminal among the pilot symbols are mapped to a first set of frequency elements in the first pilot symbol interval, and second pilot symbols for a second terminal among the pilot symbols are mapped to a second set of frequency elements in the second pilot symbol interval.

BRIEF DESCRIPTION OF THE DRAWINGS

The above and other objects, features and advantages of the present invention will become more apparent from the following detailed description when taken in conjunction with the accompanying drawings in which:

FIGS. 8A to 8C are diagrams illustrating transmission of data signals and pilot signals according to a second embodiment of the present invention;

DETAILED DESCRIPTION OF EXEMPLARY EMBODIMENTS

Exemplary embodiments of the present invention will now be described in detail with reference to the annexed drawings. In the following description, a detailed description of known functions and configurations incorporated herein has been omitted for clarity and conciseness. The terms used herein are defined taking into account their functions in the present invention, and they are subject to change according to user, user's intention, or the usual practice. Therefore, a definition thereof should be given depending on the full text of this specification.

The present invention provides apparatuses and methods to transmit a pilot and data symbols by TDM without increasing pilot overhead when a moving velocity of a terminal is high. A description will now be made of an uplink pilot transmission/reception technology for a system that can selectively use DFDMA and LFDMA for the full or partial frequency band.

Figure 4:
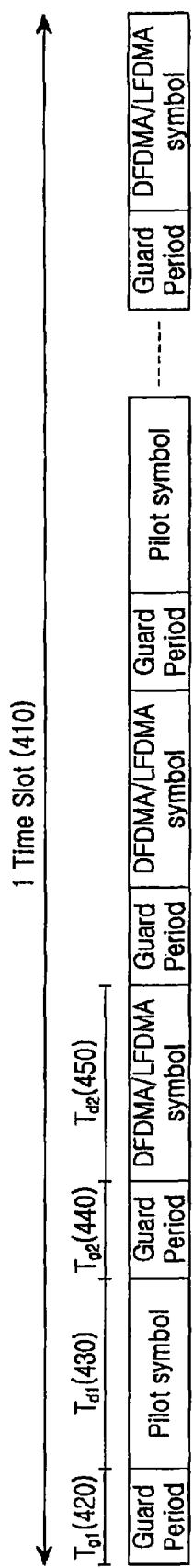
FIG. 4 is a diagram illustrating an exemplary TDM format in which a data symbol interval and a pilot symbol interval have different lengths.

FIG. 4 illustrates an example of a signal format in which a data symbol interval and a pilot symbol interval have different lengths according to an exemplary embodiment of the present invention.

As illustrated, at least two pilot symbol time intervals 430 and a plurality of data symbol time intervals 450 exist in one time slot 410, each of the pilot symbol time intervals 430 has a length of $T_{d1}$, and a guard interval $T_{g1}$ 420 is inserted in front of each of the pilot symbol time intervals. In addition, the data symbol time intervals 450 have a length of $T_{d2}$, and a guard interval $T_{g2}$ 440 is inserted in front of each of the data symbol time intervals 450. Herein, the pilot symbol interval length $T_{d1}$ is different from the data symbol interval length $T_{d2}$. Similarly, the lengths $T_{g1}$ and $T_{g2}$ of the guard intervals 420 and 440 inserted in front of the pilot symbol and the data symbol are different from each other.

That is, an exemplary embodiment of the present invention sets the pilot symbol interval length to be shorter than the data symbol interval length and uses a plurality of pilot symbol time intervals in one time slot 410 as shown in FIG. 4, so a receiver can rapidly estimate channel variation in the situation where a moving velocity of the terminal is high, with less pilot overhead.

Because a basic time element constituting the pilot and data symbols is a sample and a sampling frequency in one time interval is constant, a transmitter changes the pilot symbol interval length by changing the number of samples included in one symbol by properly adjusting values of a repetition R and a comb size C. In the following description, pilot-related parameters are denoted by $R_p$ and $C_p$, and data-related parameters are denoted by $R_d$ and $C_d$. For convenience, it is assumed that one terminal uses one comb/Region.

Figure 5A:
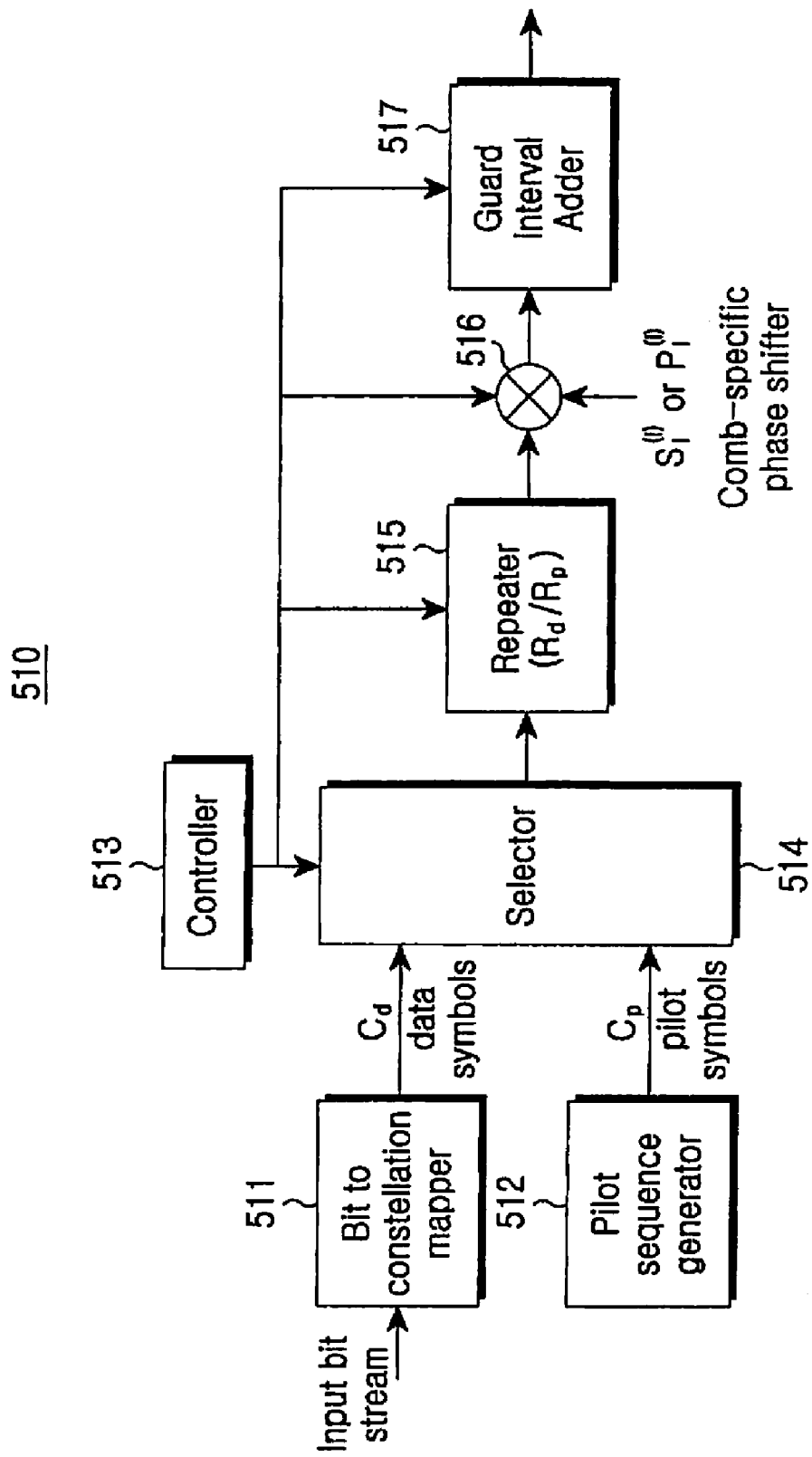
FIGS. 5A and 5B are diagrams illustrating DFDMA/LFDMA transmission apparatuses according to an exemplary embodiment of the present invention.
Figure 5B:
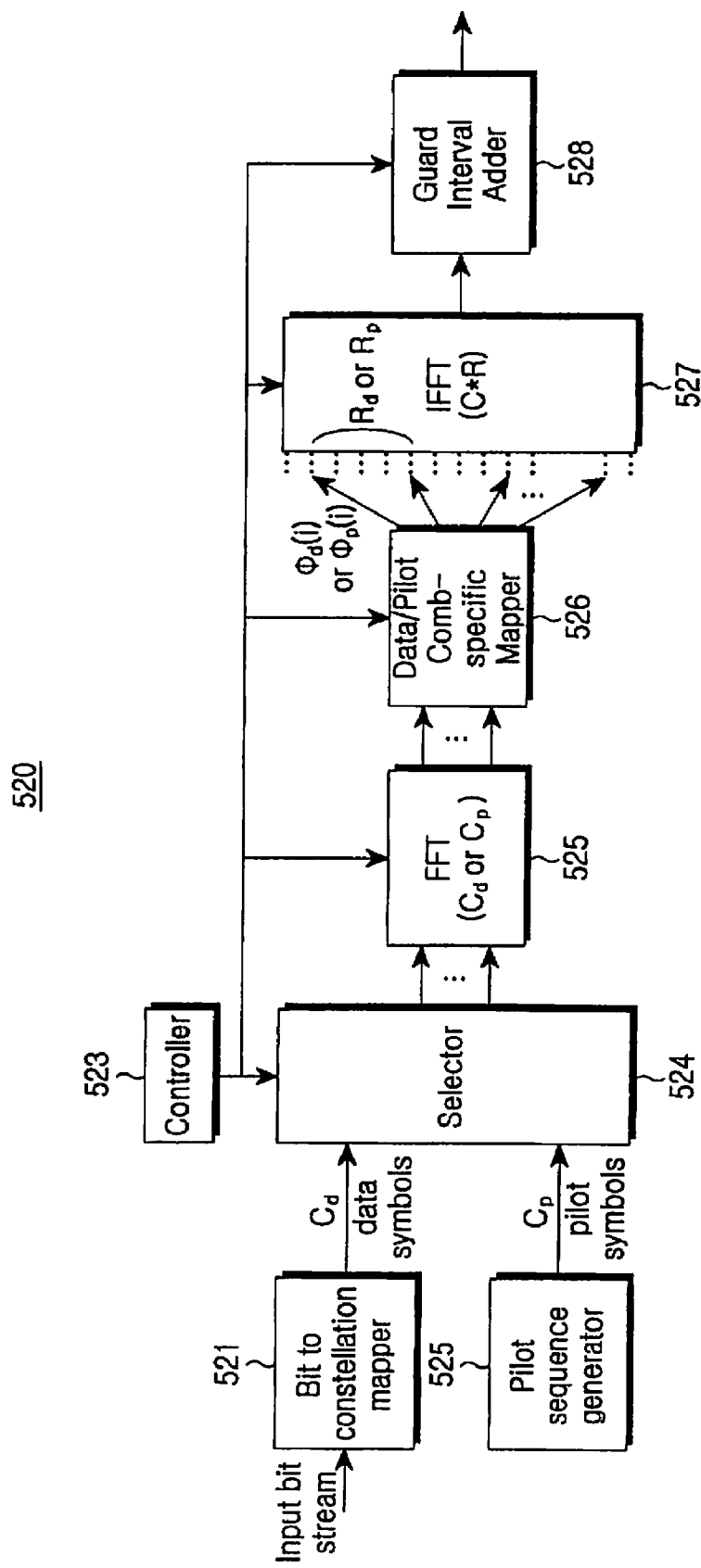

FIGS. 5A and 5B illustrate transmission apparatuses of a DFDMA system according to an exemplary embodiment of the present invention. FIG. 5A illustrates a transmission apparatus 510 in a time domain, and FIG. 5B illustrates a transmission apparatus 520 in a frequency domain.

Referring first to FIG. 5A, the transmission apparatus 510 in the time domain will be described. An input bit stream generated through error correction coding and rate matching is input to a bit-to-constellation mapper 511 where it is converted into $C_d$ data symbols according to QPSK or QAM modulation. A pilot sequence generator 512 generates $C_p$ pilot symbols, and in this case, the pilot sequence is not limited to a sequence of a specific pattern.

The symbols output from the bit-to-constellation mapper 511 and the pilot sequence generator 512 are input to a selector 514, and the selector 514 selects one of the two inputs every symbol interval according to whether the current desired transmission time symbol is allocated as a pilot or data. A control signal indicating a type for the current time symbol is generated by a controller 513, and then input in common to the selector 514, a repeater 515, a comb-specific phase shifter 516 and a guard interval adder 517. When the input control signal indicates a data symbol interval, an output of the selector 514 and an output of the bit-to-constellation mapper 511 are both $C_d$ data symbols, and when the input control signal indicates a pilot symbol interval, an output of the selector 514 becomes $C_p$ pilot symbols which are outputs of the pilot sequence generator 512.

The repeater 615 repeats the output of the selector 514 $R_d$ or $R_p$ times according to the control signal received from the controller 513. The comb-specific phase shifter 516 performs phase shifting according to Equation (4) below when the control signal received from the controller 513 indicates the data interval, and performs phase shifting according to Equation (5) below when the control signal indicates the pilot interval.

$$S_l^{(i)} = \exp\left(-j \cdot l \cdot \phi_d(i) \cdot \frac{2\pi}{R_d \cdot C_d}\right), \quad (4)$$
$$l = 0, \ldots R_d \cdot C_d - 1$$

$$p_l^{(i)} = \exp\left(-j \cdot l \cdot \phi_p(i) \cdot \frac{2\pi}{R_p \cdot C_p}\right), \quad (5)$$
$$l = 0, \ldots R_p \cdot C_p - 1$$

In Equations (4) and (5), i denotes an index of a terminal, and $\Phi_d(i)$ and $\Phi_p(i)$ denote a data comb index and a pilot comb index allocated to an $i^{th}$ terminal, respectively. Each comb index, as described above, means the position where the first frequency element starts. A common parameter l of Equation (4) and Equation (5) denotes a sample index in the time domain. There are $R_d \cdot C_d$ samples in the data interval and there are $R_p \cdot C_p$ samples in the pilot interval. Because the sampling frequency is constant, lengths of the data symbol interval and the pilot symbol interval differ according to $R_d \cdot C_d$ and $R_p \cdot C_p$.

The guard interval adder 517 inserts a guard interval for preventing inter-symbol interference, to the phase-shifted signal, and transmits the guard interval-inserted signal over a wireless channel. Herein, the guard interval adder 517 uses zero-padding and/or periodic prefix.

Next, with reference to FIG. 5B, a description will be made of the transmission apparatus 520 in the frequency domain. A bit-to-constellation mapper 521, a pilot sequence generator 522, a controller 523, a selector 524 and a guard interval adder 528 are equal in operation to their associated entities of FIG. 5A, so a description thereof will be omitted.

An output of the selector 524 is input to an FFT block 525 where it is converted into a frequency-domain signal. A size of the FFT block 525 is determined as $C_d$ (for data symbol interval) or $C_p$ (for pilot symbol interval) according to the control signal generated by the controller 523. An output of the FFT block 525 is mapped to an input of an IFFT block 527 by a comb-specific mapper 526. In the DFDMA system, outputs of the FFT block 525 are input to the IFFT block 527 at stated intervals, and a detailed mapping method follows Equation (6) for the data symbol interval, and Equation (7) for the pilot symbol interval.

$$n = \Phi_d(i) + m^* R_d, m = 0, \ldots, C_d - 1 \quad (6)$$

$$n = \Phi_p(i) + m^* R_p, m = 0, \ldots, C_p - 1 \quad (7)$$

In Equations (6) and (7), i denotes an index of a terminal, and $\Phi_d(i)$ and $\Phi_p(i)$ denote a data comb index and a pilot comb index allocated to an $i^{th}$ terminal, respectively. In addition, m and n denote an FFT output node index and an IFFT input node index, respectively. That is, according to Equation (6) and Equation (7), an $m^{th}$ output of the FFT block 525 is mapped to an $n^{th}$ input of the IFFT block 527.

The IFFT block 527 converts an input frequency-domain signal into a time-domain signal, and the guard interval adder 528 adds a guard interval to the time-domain signal and transmits the guard interval-added signal over a wireless channel.

Figure 6:
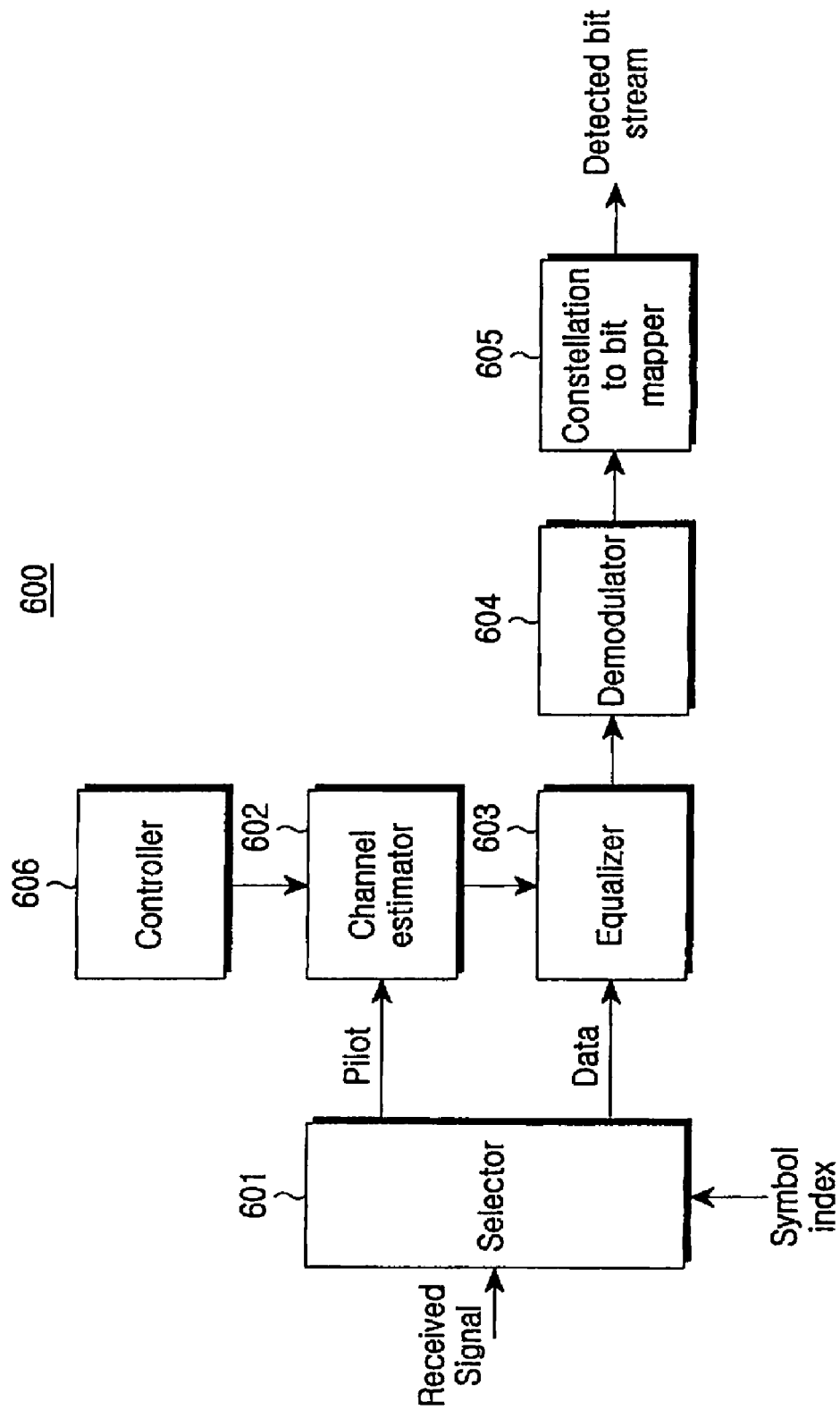
FIG. 6 is a diagram illustrating a typical DFDMA/LFDMA reception apparatus.

FIG. 6 illustrates a reception apparatus 600 in a time/frequency domain of a DFDMA/LFDMA system according to an exemplary embodiment of the present invention.

Referring to FIG. 6, a divider 601 receives a signal of one time slot, distinguishes it for each frequency element, and divides the received signal into a pilot signal and a data signal in one time slot according to the current symbol index received as a control signal. The divider 601 separates pilot signals corresponding to at least two pilot symbols according to the number of pilot symbol intervals in one time slot and a pilot symbol interval length, both of which are previously known. In particular, the divider 601 divides the frequency elements to which data symbols and pilot symbols are mapped, into pilot signals and data signals.

The pilot signal is input to a channel estimator 602 where it is used for estimating all channels, and a data signal is input to an equalizer 603. The equalizer 603 compensates for distortion of the data signal, occurred due to fading, using a channel estimated value output from the channel estimator 602. A demodulator 604 OFDM-demodulates the compensated data signal into a time-domain signal, and a constellation-to-bit mapper 605 converts the signal-domain signal into a bit stream.

A controller 606 controls operation of the divider 601 and the channel estimator 602 according to first, second and third embodiments of the present invention. As a result, the data signal is channel-compensated by the equalizer 603 using the channel estimated value corresponding to the frequency (Regent in LFDMA or comb in DFDMA) at which a desired data signal is transmitted. In this case, if there is no pilot corresponding to the frequency where the data signal is transmitted, the controller 606 performs interpolation in the frequency domain, and channel-compensates the data signal using the channel estimated value obtained through the interpolation.

The technology proposed in exemplary embodiments of the present invention, in which a data symbol interval and a pilot symbol interval are different in length and a TDM pilot pattern is used, can be implemented with the transmission apparatuses of FIGS. 5A and 5B, and various embodiments are possible according to $R_d \cdot C_d$, $R_p \cdot C_p$, $\Phi_d(i)$ and $\Phi_p(i)$. A description will now be made of spectrums and characteristics of TDM signals according to three exemplary embodiments.

First Embodiment $R_d=4, C_d=8, R_p=4, C_p=4$

For convenience, the first embodiment will be described on the assumption that a pilot symbol interval length is ½ of a data symbol interval length and two pilot symbols are transmitted in one time interval. In this embodiment, $R_d=4$, $C_d=8$, and $R_d \cdot C_d$ (=32) is a double of $R_p \cdot C_p$ (=16).

Figure 7A:
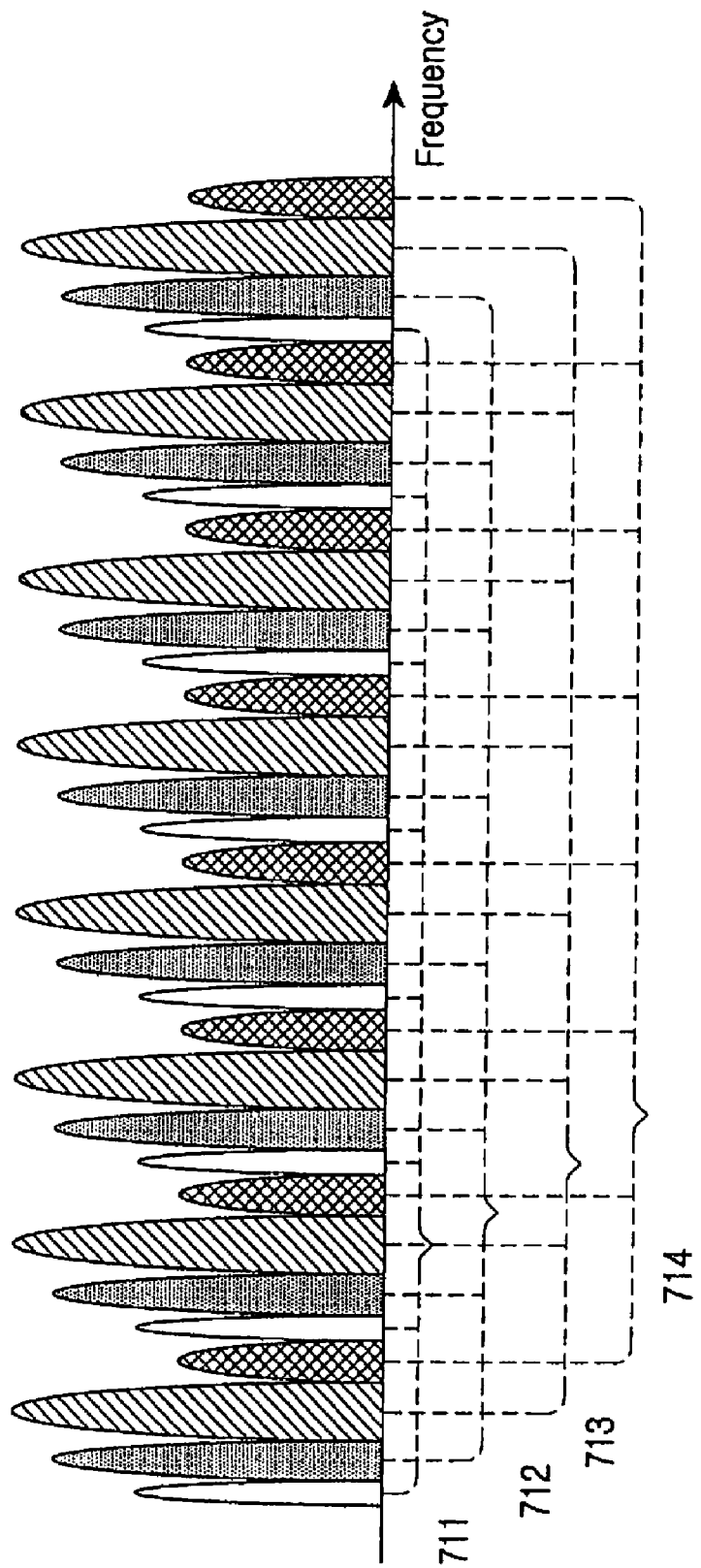
FIGS. 7A and 7B are diagrams illustrating transmission of data signals and pilot signals according to a first embodiment of the present invention.
Figure 7B:
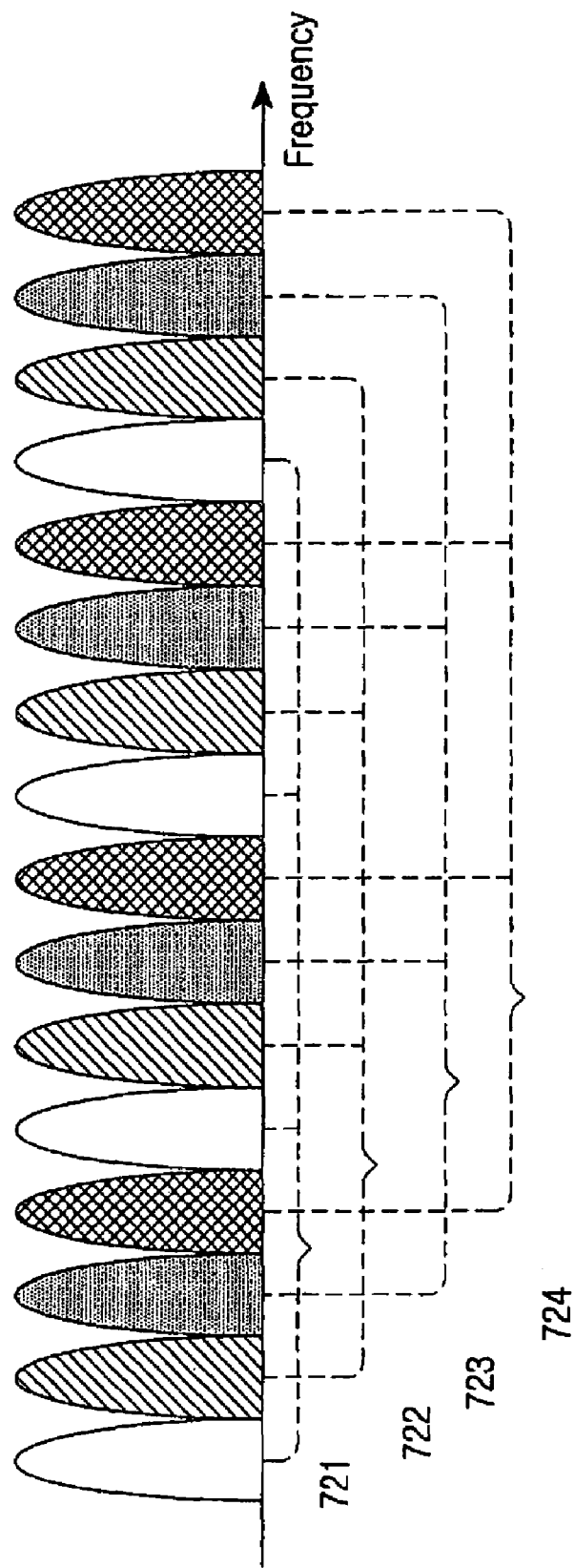

FIGS. 7A and 7B illustrate transmission of data signals and pilot signals according to a first embodiment of the present invention.

FIG. 7A illustrates a frequency-domain spectrum 710 where a data signal is transmitted, and 4 terminals allocated 4 combs 711 to 714 are called a terminal 1 through a terminal 4, respectively. For the terminal 1, as it uses a first comb 711 of the data signal, its data comb index is $\Phi_d(1)=1$. For the terminal 2, as it uses a second comb 712 of the data signal, its data comb index is $\Phi_d(2)=2$. For the terminal 3, as it uses a third comb 713 of the data signal, its data comb index is $\Phi_d(3)=3$. For the terminal 4, as it uses a fourth comb 714 of the data signal, its data comb index is $\Phi_d(4)=4$.

FIG. 7B illustrates a spectrum 720 in a common frequency domain, where two pilot symbol signals are transmitted. For a terminal 1, as it uses a first comb 721 of the pilot signal, its pilot comb index is $\Phi_p(1)=1$. For a terminal 2, as it uses a third comb 723 of the pilot signal, its pilot comb index is $\Phi_p(2)=3$. For a terminal 3, as it uses a second comb 722 of the pilot signal, its pilot comb index is $\Phi_p(3)=2$. For a terminal 4, as it uses a fourth comb 724 of the pilot signal, its pilot comb index is $\Phi_p(4)=4$.

Figure 1:
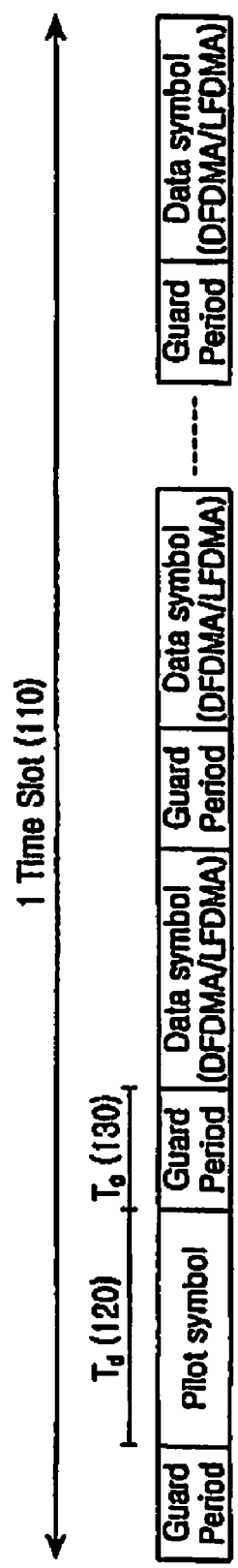
FIG. 1 is a diagram illustrating typical TDM-formatted data signals and pilot signals.
Figure 2A:
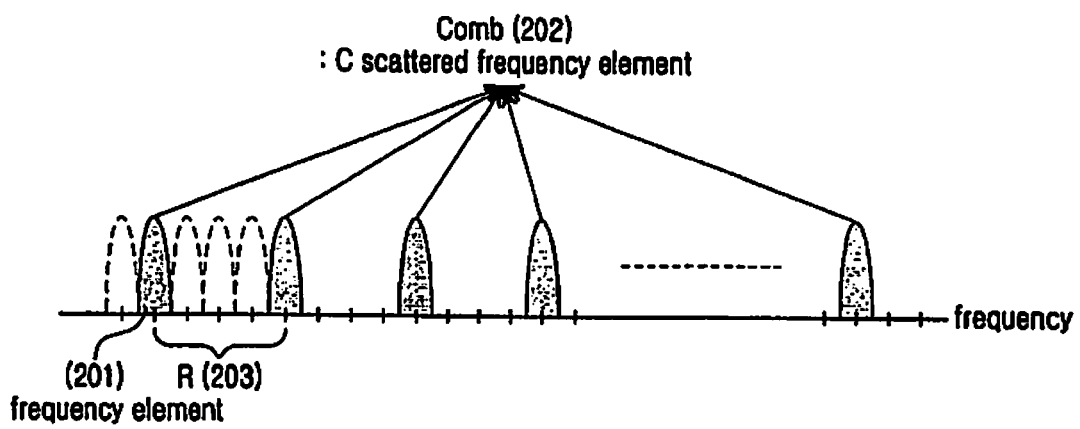
FIGS. 2A to 2D are diagrams illustrating a typical DFDMA transmission apparatus.
Figure 2B:
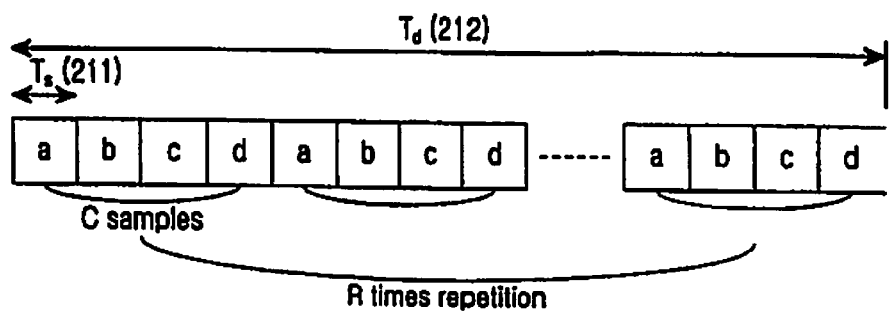
Figure 2C:
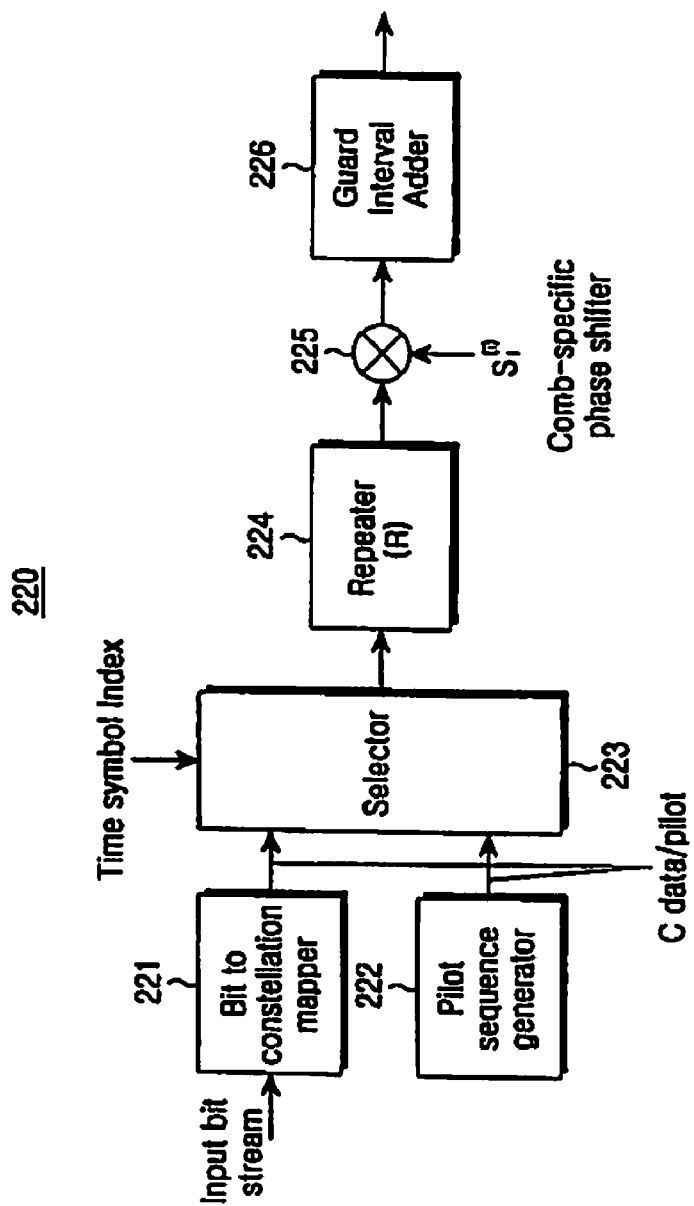
Figure 2D:
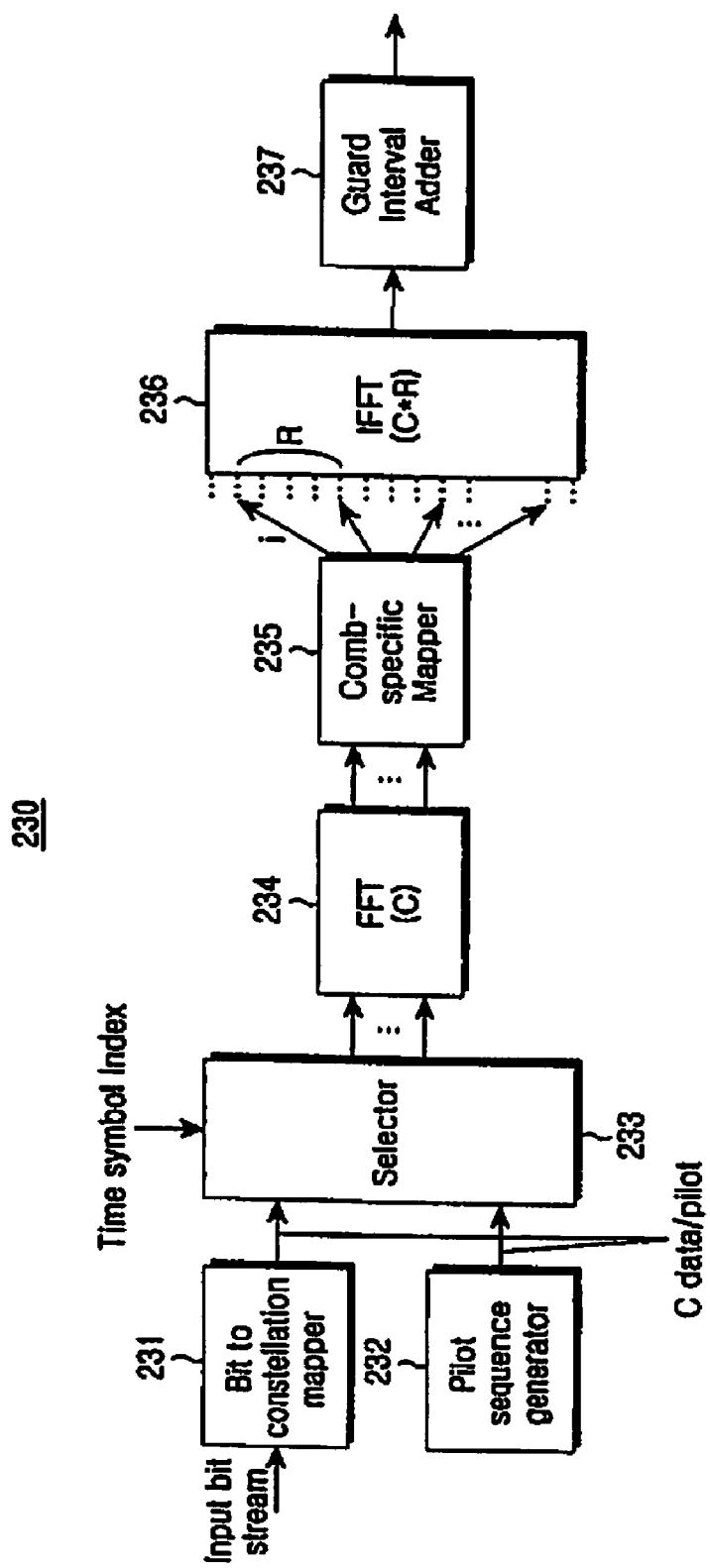
Figure 3A:
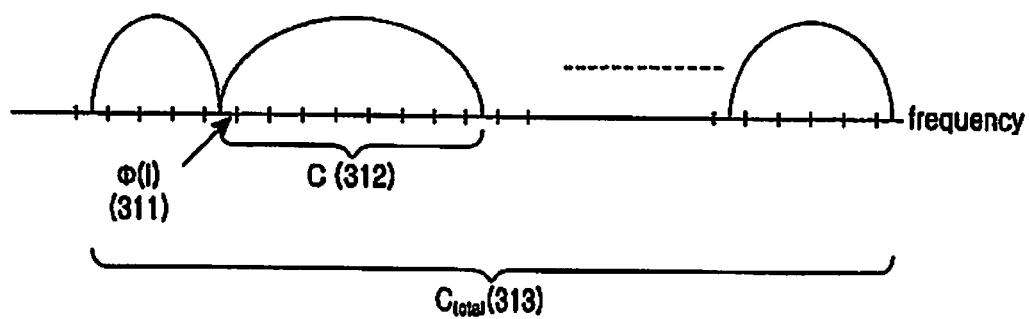
FIGS. 3A and 3B are diagrams illustrating a typical LFDMA transmission apparatus.
Figure 3B:
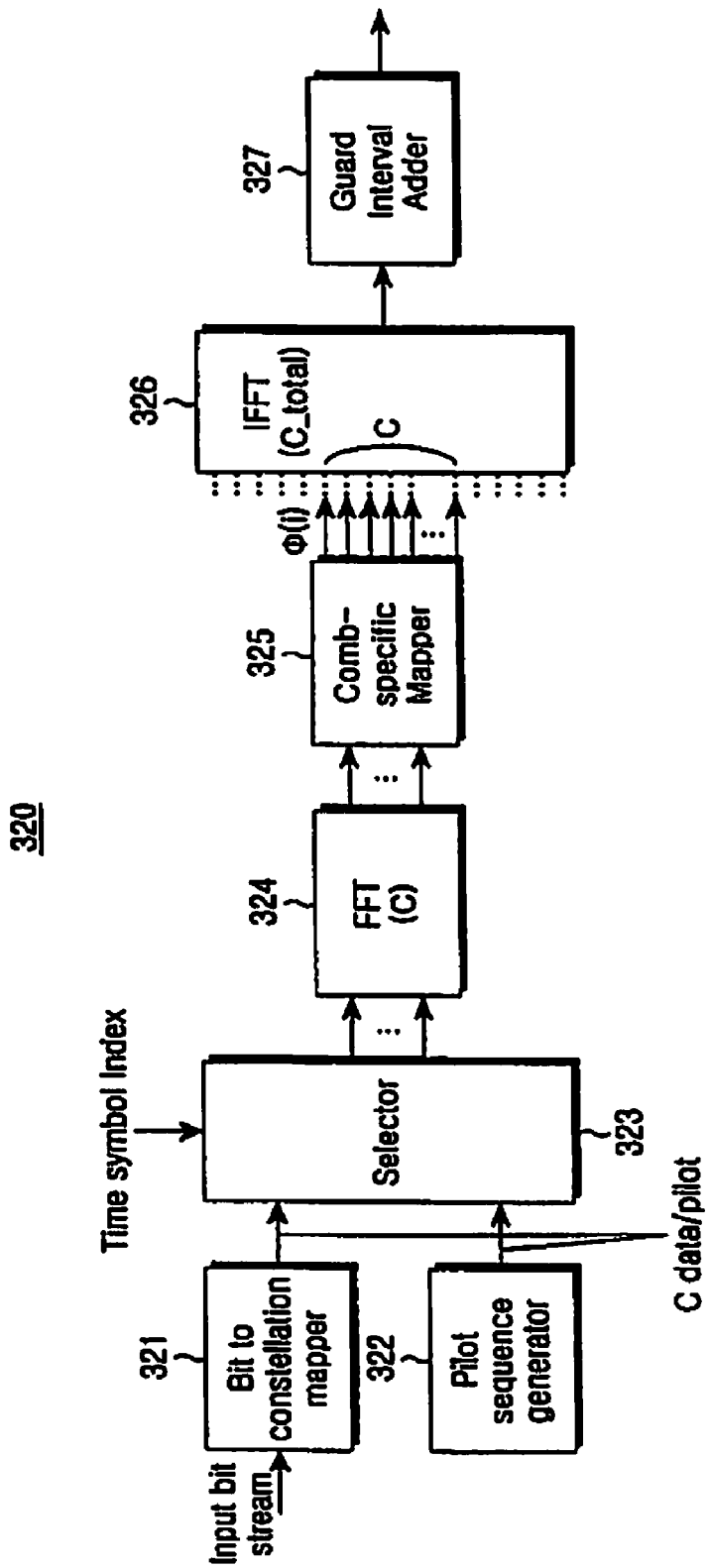

The forgoing description is for the DFDMA system, and for the LFDMA system, the first embodiment can be applied by using $R_d=1$, $C_d=8$, $R_p=1$, $C_p=4$, and $C_{total}=32$ for the method described in FIG. 3.

The first embodiment has been described so far in which the pilot symbol interval is different in length from the data symbol interval and a plurality of pilot symbol intervals have the same comb indexes in the DFDMA/LFDMA system. Because a plurality of pilot symbols each having a short time interval exist in one time slot, the first embodiment can estimate fast channel variation in the time domain with the pilot overhead similar to the conventional one.

As to a channel estimation process of a receiver according to the first embodiment, because the pilot combs exist only in ½ of the frequency domain forming the data combs in FIG. 7, the channel estimation process performs interpolation of finding a channel estimated value of a corresponding frequency domain using channel estimated values of adjacent pilot combs for data signals of the frequency domain where there is no pilot comb.

Second Embodiment $R_d=4, C_d=8, R_p=4, C_p=4$

The second embodiment uses the same parameter values as those used in the first embodiment.

Figure 8B:
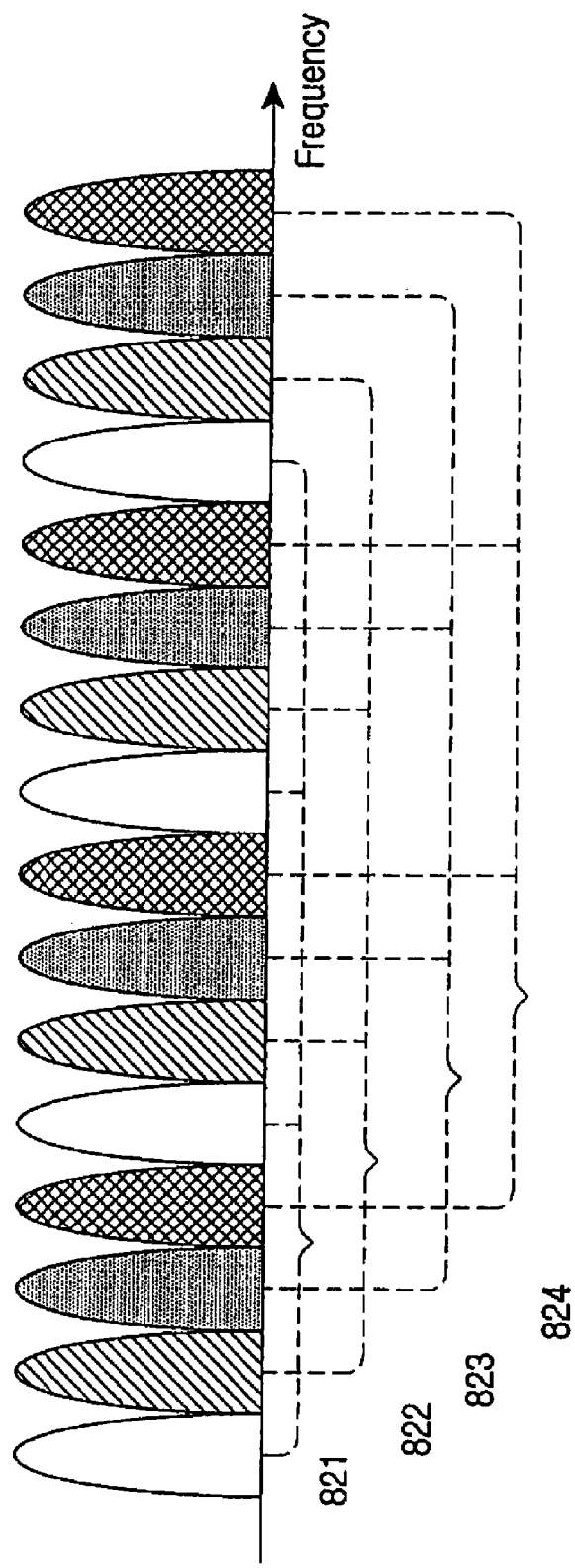
Figure 8C:
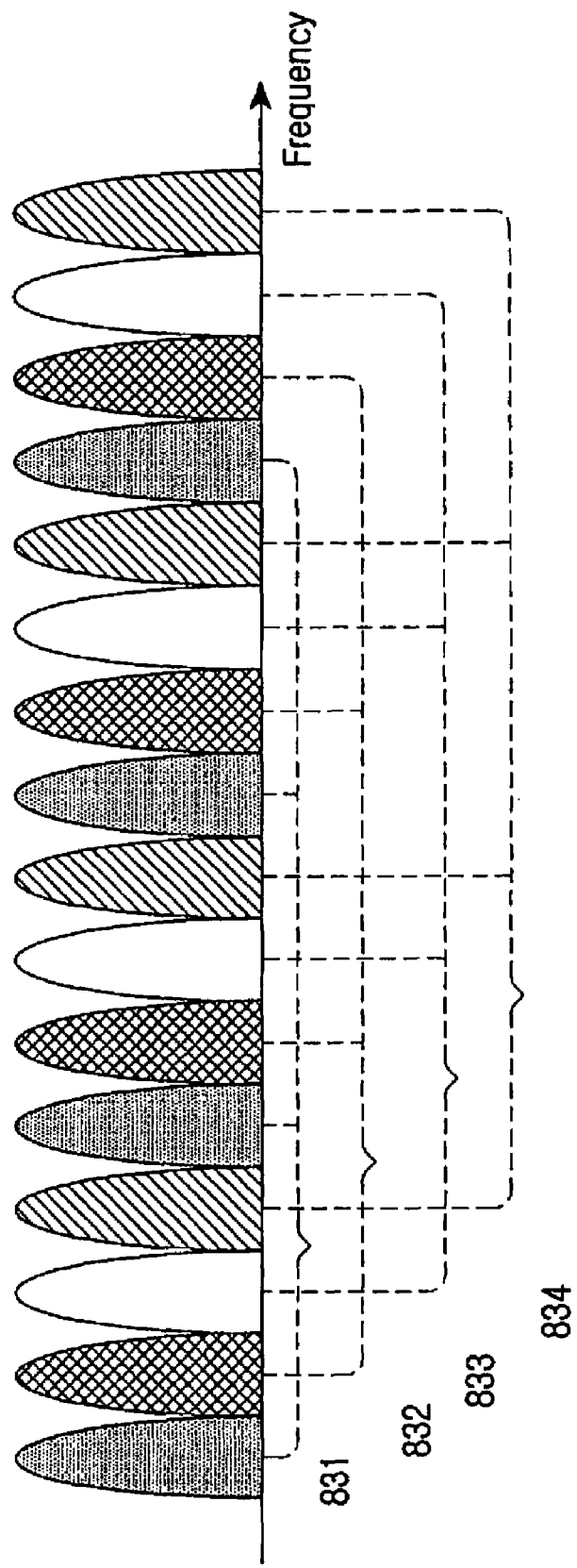

FIGS. 8A to 8C illustrate transmission of data signals and pilot signals according to the second embodiment of the present invention.

FIG. 8A illustrates a frequency-domain spectrum 810 of a data signal. Similarly to the frequency-domain spectrum 710 of the data signal shown in FIG. 7A, there are 4 data combs 811, 812, 813 and 814 allocated to a terminal 1 through a terminal 4. FIGS. 8B and 8C illustrate frequency-domain spectrums 820 and 830 for two pilot symbol signals, respectively. The second embodiment differentiates a comb index of a terminal, being set in a first pilot symbol, from a comb index of a terminal, being set in a second pilot symbol. That is, the second embodiment uses a pilot pattern differently shifted in the frequency domain for each individual pilot symbol.

The frequency-domain spectrum 820 of the first pilot signal is identical to the pilot symbol spectrum 720 of FIG. 7B. A comparison between the frequency-domain spectrum 830 of the second pilot signal and the first spectrum 820 will be made hereinbelow. Similarly to the first embodiment, there are 4 terminals of a terminal 1 through a terminal 4.

In the second pilot symbol, for the terminal 1, as it uses a third comb 823 of a pilot signal, its pilot comb index is $\Phi_p(1)=3$. For the terminal 2, as it uses a first comb 821 of the pilot signal, its pilot comb index is $\Phi_p(2)=1$. For the terminal 3, as it uses a fourth comb 824 of the pilot signal, its pilot comb index is $\Phi_p(3)=4$. For the terminal 4, as it uses a second comb 822 of the pilot signal, its pilot comb index is $\Phi_p(4)=2$.

Taking the embedment of the DFDMA system into consideration, it is possible to apply the second embodiment even to the LFDMA system, using $R_d=1$, $C_d=8$, $R_p=1$, $C_p=4$, and $C_{total}=32$.

The second embodiment has been described so far in which the pilot symbol interval is different in length from the data symbol interval and a spectrum of a plurality of pilot symbol intervals uses a different comb index where one terminal shifts in the frequency domain in the DFDMA/LFDMA system. Because a plurality of pilot symbols having a short time interval exist in one time slot, the second embodiment can estimate fast channel variation in the time domain with the pilot overhead similar to the conventional one.

When different comb indexes are used in two pilot symbol intervals in one time slot as done in the second embodiment, it is also possible to obtain a channel estimated value of the full frequency domain constituting the data combs without interpolation of the frequency domain. Even though the examples described in FIGS. 8B and 8C are extended to the case where more than two pilot symbol intervals exist in one time slot, the interpolation in the frequency domain can be unnecessary if a comb index of each individual pilot symbol is differentiated.

Third Embodiment $R_d=4, C_d=8, R_p=2, C_p=8$

Figure 9A:
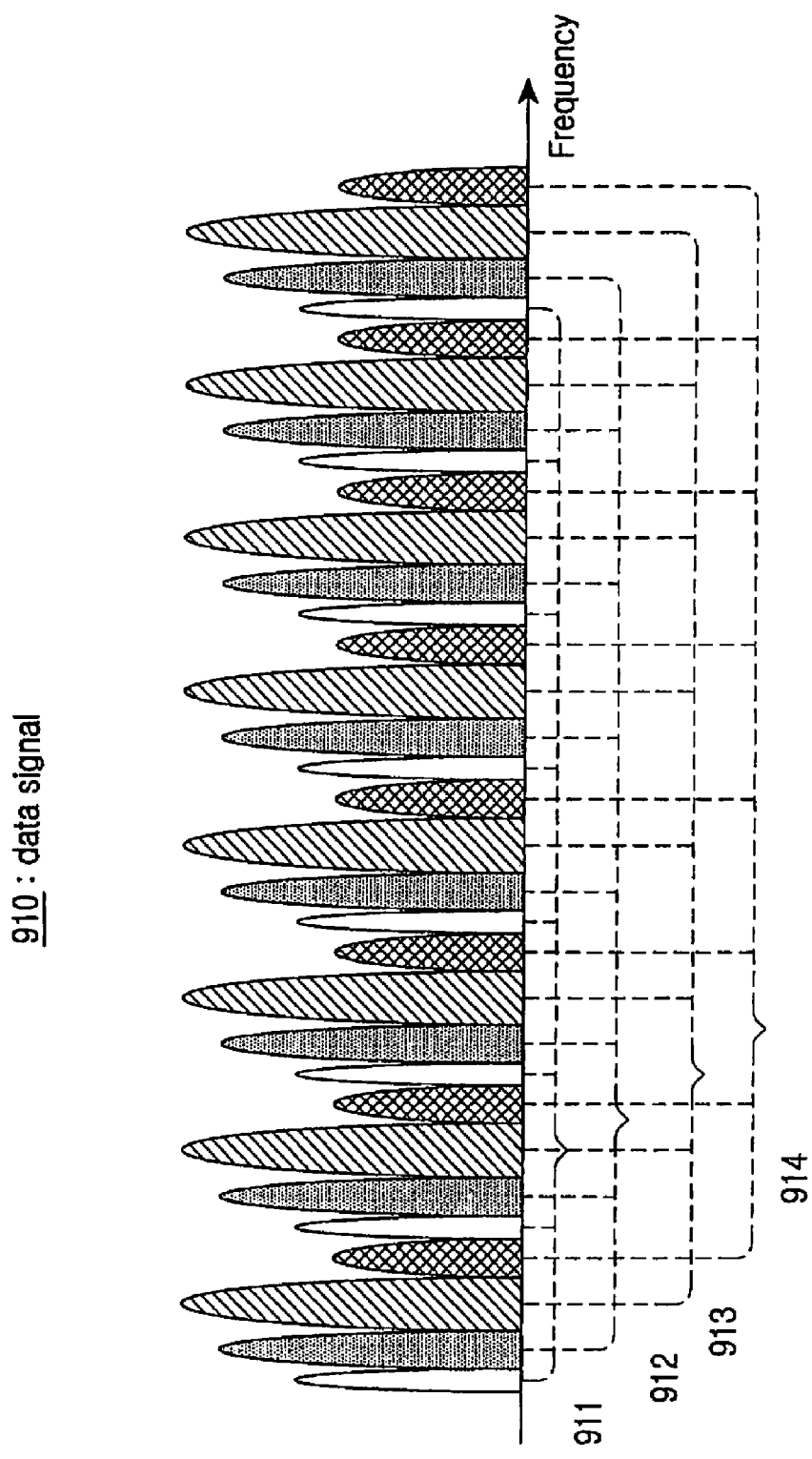
FIGS. 9A to 9C are diagrams illustrating transmission of data signals and pilot signals according to a third embodiment of the present invention.
Figure 9B:
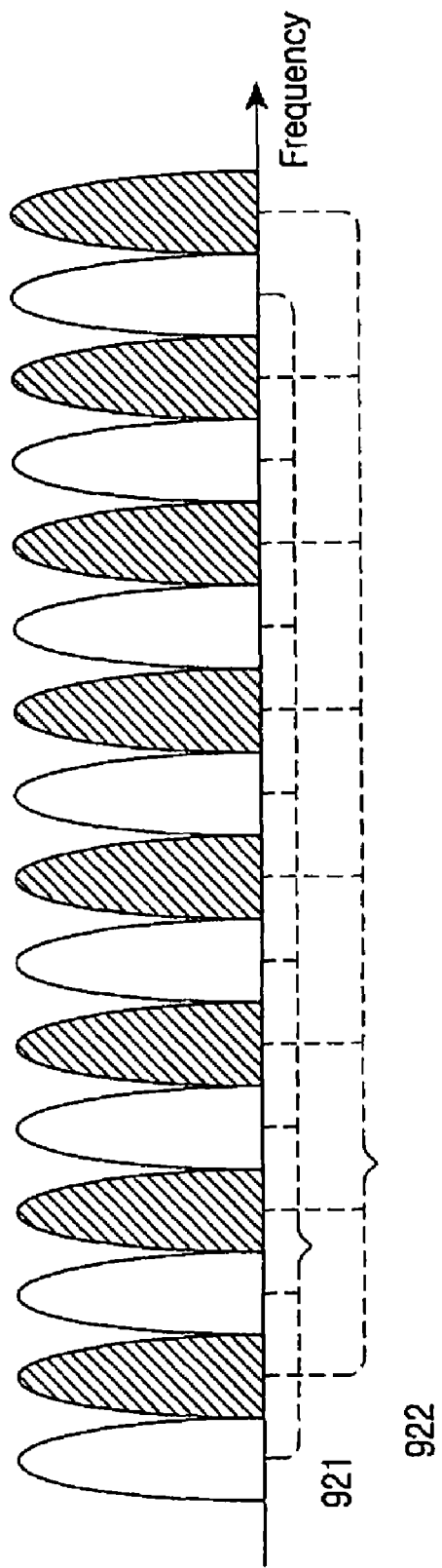
Figure 9C:
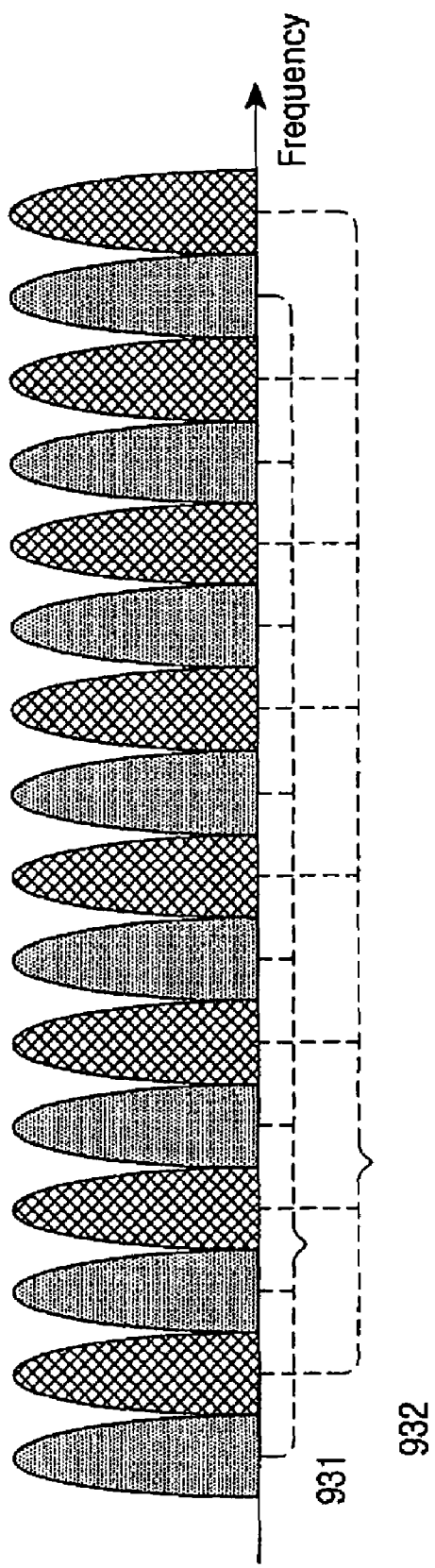

FIGS. 9A to 9C illustrate transmission of data signals and pilot signals according to the third embodiment of the present invention. Similarly to the second embodiment, the third embodiment uses two pilot symbol signals in one time slot. FIG. 9A illustrates a frequency-domain spectrum 910 of a data signal, and there are 4 data combs 911, 912, 913 and 914, which are allocated to a terminal 1 through a terminal 4, respectively. FIGS. 9A and 9B illustrate frequency-domain spectrums 920 and 930 of two pilot signals. Because $R_p=2$ and $C_p=8$ for the pilot, the third embodiment transmits pilot signals for the full frequency region where two terminals transmit data in each pilot symbol interval.

In the first pilot symbol, for the terminal 1, as it uses a first pilot comb 921, its pilot comb index is $\Phi_p(1)=1$. For the terminal 3, as it uses a second pilot comb 922, its pilot comb index is $\Phi_p(3)=2$. In the second pilot signal, for the terminal 2, as it uses a first pilot comb 931, its pilot comb index is $\Phi_p(2)=1$. For the terminal 4, as it uses a second pilot comb 932, its pilot comb index is $\Phi_p(4)=2$. The LFDMA system implementation method using the embodiment of the DFDMA system is also equal to the above-described method.

Figure 10:
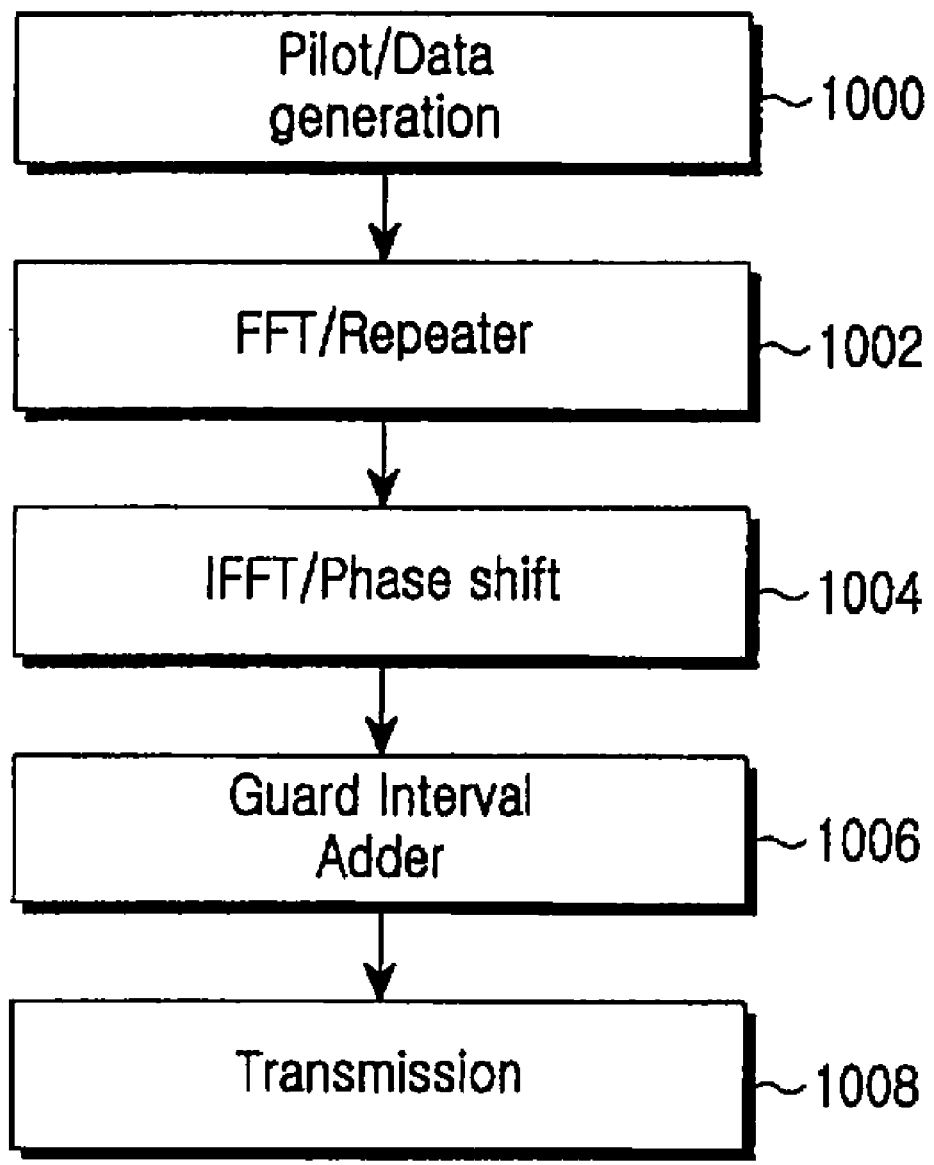
FIG. 10 is a flowchart illustrating a pilot transmission operation according to an exemplary embodiment of the present invention.

With reference to FIG. 10, a description will now be made of a pilot transmission operation according to an exemplary embodiment of the present invention.

Referring to FIG. 10, a transmitter generates pilot or data symbols in step 1000, and repeats the pilot or data symbols or performs FFT thereon in step 1002. The generation of the pilot or data symbols in step 1000 is achieved by selecting symbols of the type corresponding to the current symbol index according to the signal format shown in FIG. 4. The data or pilot signal that underwent repetition or FFT in step 1002 undergoes comb-specific phase shifting or IFFT, so it is mapped to the corresponding allocated resources. The frequency resources (Region in the LFDMA or comb in the DFDMA) mapped through the phase shifting or IFFT are set taking into account any one of the first, second and second embodiments, and the first and second pilot symbol intervals according to the signal format disclosed in FIG. 4. In step 1006, a guard interval is added to the pilot and data signals mapped in steps 1002 and 1004, and then transmitted in step 1008.

Figure 11:
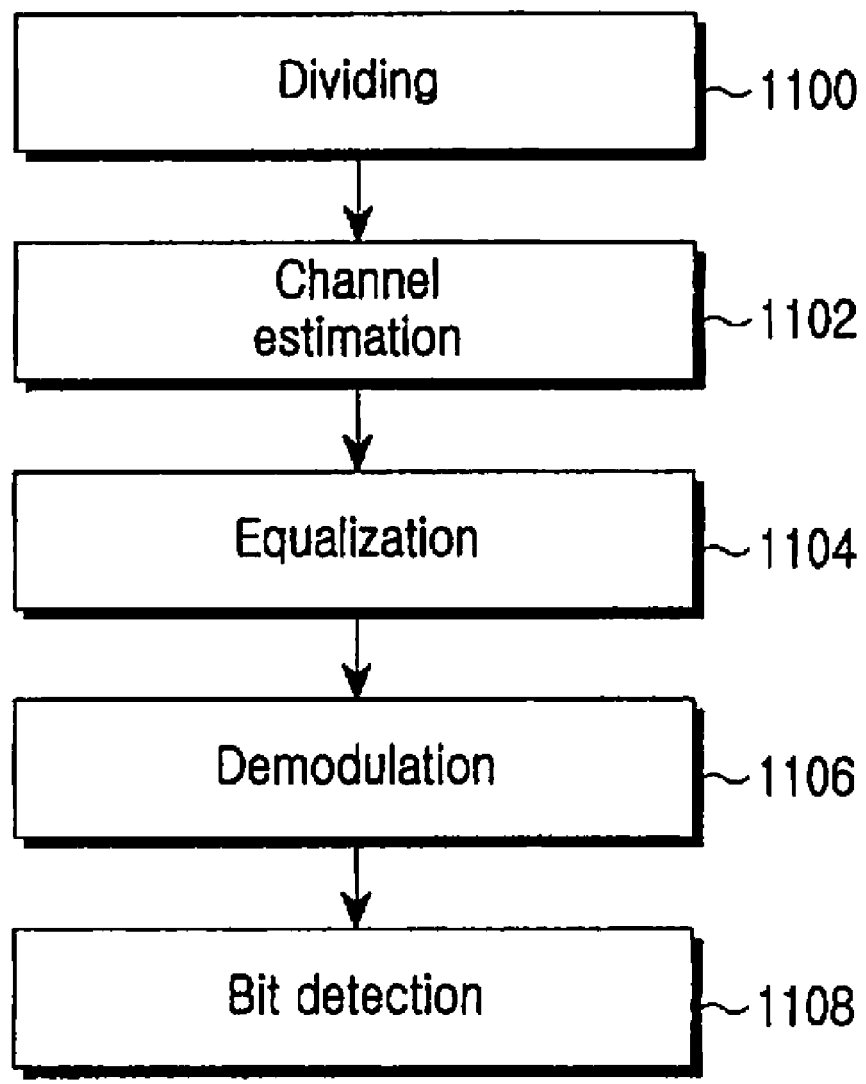
FIG. 11 is a flowchart illustrating a pilot reception operation according to an exemplary embodiment of the present invention.

With reference to FIG. 11, a description will now be made a pilot reception operation according to an exemplary embodiment of the present invention.

Referring to FIG. 11, a receiver determines in step 1100 whether the received signal is a pilot signal or a data signal according to the current symbol index. If the current received signal is a pilot signal, the receiver proceeds to step 1102. If the current received signal is a data signal, the receiver proceeds to step 1104.

In step 1102, the receiver estimates a channel using the pilot signal. In performing channel estimation, the receiver finds channel estimated values of a frequency (Region in the LFDMA or comb in the DFDMA) where a pilot signal is transmitted, and finds channel estimated values corresponding to the frequency where a desired data signal is transmitted according to any one of the first, second and third embodiments. If there is no pilot signal of the (desired) frequency where the desired data signal is transmitted, the receiver finds the channel estimated values of the desired frequency through frequency interpolation. In step 1104, the receiver performs channel compensation on the data signal using the channel estimated value. In step 1106, the receiver demodulates the channel-compensated data signal. In step 1108, the receiver recovers the transmitted information bits from the demodulated data.

As can be understood from the foregoing description, the present invention uses a plurality of pilot symbol intervals while differentiating a length of the pilot intervals from a length of the data intervals, making it possible to obtain less overhead and excellent channel estimation performance even in the situation where a channel suffers fast variation due to the high-velocity movement in the LFDMA system. In the DFDMA system, the present invention differently sets the comb indexes that one terminal uses in a plurality of pilot symbol intervals, or allows the terminal to use only one of the plurality of pilot symbol intervals, thereby compensating for degradation of the channel estimation performance due to interpolation in the frequency domain. Therefore, the pilot pattern proposed by the present invention efficiently operates in the LFDMA system even at the high rate, and does not cause the channel estimation performance degradation problem due to the interpolation of the frequency domain in the DFDMA system, contributing to improvement in the channel estimation performance of the entire system in various environments.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. An apparatus for transmitting an uplink pilot in a frequency division multiple access system, the apparatus comprising:

a bit-to-constellation mapper for generating data symbols;

a pilot sequence generator for generating pilot symbols;

a selector for selecting the data symbols in data symbol intervals of one time slot including the data symbol intervals and inconsecutive first and second pilot symbol intervals, which have a shorter length than the data symbol intervals, and selecting the pilot symbols in the first pilot symbol interval and the second pilot symbol interval; and a mapper for mapping the data symbols to frequency elements given for data transmission in the data symbol intervals before transmission, mapping the pilot symbols to a first set of frequency elements in the first pilot symbol interval before transmission, and mapping the pilot symbols to a second set of frequency elements in the second pilot symbol interval before transmission, wherein a length of each of the data symbol intervals, a length of the first pilot symbol interval, and a length of the second pilot symbol interval are determined according to a number of samples, and wherein a sample is a basic time unit constituting the data symbols and the pilot symbols.

2. The apparatus of claim 1, wherein each of the first set of frequency elements and the second set of frequency elements comprises inconsecutive frequency elements.

3. The apparatus of claim 1, wherein each of the first set of frequency elements and the second set of frequency elements comprises consecutive frequency elements.

4. The apparatus of claim 1, wherein the mapper comprises:
a repeater for repeating each of the data symbols or the pilot symbols; and
a phase shifter for phase-shifting the repeated symbols by a predetermined phase value based on a position of a first frequency element to which the data symbols or the pilot symbols are mapped.

5. The apparatus of claim 1, wherein the mapper comprises:
a Fast Fourier Transform (FFT) block for FFT-transforming the data symbols or the pilot symbols;
an Inverse Fast Fourier Transform (IFFT) block for IFFT-transforming outputs of the FFT block; and
a specific mapper for mapping the outputs of the FFT block to inputs of the IFFT block according to positions of frequency elements to which the data symbols or the pilot symbols are mapped.

6. A method for transmitting an uplink pilot in a frequency division multiple access system, the method comprising:
transmitting data symbols in data symbol intervals of one time slot including the data symbol intervals and inconsecutive first and second pilot symbol intervals, which have a shorter length than the data symbol intervals;
transmitting pilot symbols through a first set of frequency elements in the first pilot symbol interval; and
transmitting the pilot symbols through a second set of frequency elements in the second pilot symbol interval,
wherein a length of each of the data symbol intervals, a length of the first pilot symbol interval, and a length of the second pilot symbol interval are determined according to a number of samples, and
wherein a sample is a basic time unit constituting the data symbols and the pilot symbols.

7. The method of claim 6, wherein each of the first set of frequency elements and the second set of frequency elements includes inconsecutive frequency elements.

8. The method of claim 7, wherein each of the first set of frequency elements and the second set of frequency elements is distinguished by a position of a first frequency element where each set starts in a full frequency band.

9. The method of claim 6, wherein each of the first set of frequency elements and the second set of frequency elements includes consecutive frequency elements.

10. The method of claim 9, wherein each of the first set of frequency elements and the second set of frequency elements is distinguished by a position of a first frequency element where each set starts in a full frequency band.

11. A method for transmitting an uplink pilot in a frequency division multiple access system, the method comprising:
transmitting data symbols for terminals in data symbol intervals of one time slot including the data symbol intervals and inconsecutive first and second pilot symbol intervals, which have a shorter length than the data symbol intervals;
transmitting first pilot symbols for a first terminal among the terminals through a first set of frequency elements in the first pilot symbol interval; and
transmitting second pilot symbols for a second terminal among the terminals through a second set of frequency elements in the second pilot symbol interval,
wherein a length of each of the data symbol intervals, a length of the first pilot symbol interval, and a length of the second pilot symbol interval are determined according to a number of samples, and
wherein a sample is a basic time unit constituting the data symbols and the pilot symbols.

12. The method of claim 11, wherein each of the first set of frequency elements and the second set of frequency elements includes inconsecutive frequency elements.

13. The method of claim 12, wherein each of the first set of frequency elements and the second set of frequency elements is distinguished by a position of a first frequency element where each set starts in a full frequency band.

14. The method of claim 11, wherein each of the first set of frequency elements and the second set of frequency elements includes consecutive frequency elements.

15. The method of claim 14, wherein each of the first set of frequency elements and the second set of frequency elements is distinguished by a position of a first frequency element where each set starts in a full frequency band.

16. An apparatus for transmitting an uplink pilot in a frequency division multiple access system, the apparatus comprising:
a bit-to-constellation mapper for generating data symbols;
a pilot sequence generator for generating pilot symbols;
a selector for selecting the data symbols in data symbol intervals of one time slot including the data symbol intervals and inconsecutive first and second pilot symbol intervals, which have a shorter length than the data symbol intervals, and selecting the pilot symbols in the first pilot symbol interval and the second pilot symbol interval; and
a mapper for mapping the data symbols to frequency elements given for data transmission in the data symbol intervals before transmission, mapping the pilot symbols through a first set of frequency elements in the first pilot symbol interval before transmission, and waiting in the second pilot symbol interval without mapping the pilot symbols,
wherein a length of each of the data symbol intervals, a length of the first pilot symbol interval, and a length of the second pilot symbol interval are determined according to a number of samples, and
wherein a sample is a basic time unit constituting the data symbols and the pilot symbols.

17. The apparatus of claim 16, wherein each of the first set of frequency elements and the second set of frequency elements comprises inconsecutive frequency elements.

18. The apparatus of claim 16, wherein each of the first set of frequency elements and the second set of frequency elements comprises consecutive frequency elements.

19. The apparatus of claim 16, wherein the mapper comprises:
a repeater for repeating each of the data symbols or the pilot symbols; and
a phase shifter for phase-shifting the repeated symbols by a predetermined phase value based on a position of a first frequency element to which the data symbols or the pilot symbols are mapped.

20. The apparatus of claim 16, wherein the mapper comprises:
a Fast Fourier Transform (FFT) block for FFT-transforming the data symbols or the pilot symbols;
an Inverse Fast Fourier Transform (IFFT) block for IFFT-transforming outputs of the FFT block; and a specific mapper for mapping the outputs of the FFT block to inputs of the IFFT block according to positions of frequency elements to which the data symbols or the pilot symbols are mapped.

21. An apparatus for receiving an uplink pilot in a frequency division multiple access system, the apparatus comprising:
a divider for receiving a signal of one time slot including data symbol intervals and inconsecutive first and second pilot symbol intervals which have a shorter length than the data symbol intervals, distinguishing the received signal for each frequency element, and dividing the received signal into data symbols of the data symbol intervals and pilot symbols of the first pilot symbol interval and the second pilot symbol interval;
a channel estimator for performing channel estimation using the pilot symbols;
an equalizer for channel-compensating the data symbols using channel estimated values from the channel estimator;
a demodulator for Orthogonal Frequency Division Multiplexing (OFDM)-demodulating the channel-compensated data symbols; and
a constellation-to-bit mapper for converting the demodulated signal into a bit stream;
wherein the data symbols are mapped to given frequency elements in the data symbol intervals, the pilot symbols are mapped to a first set of frequency elements in the first pilot symbol interval, and the pilot symbols are mapped to a second set of frequency elements in the second pilot symbol interval,
wherein a length of each of the data symbol intervals, a length of the first pilot symbol interval, and a length of the second pilot symbol interval are determined according to a number of samples, and
wherein a sample is a basic time unit constituting the data symbols and the pilot symbols.

22. The apparatus of claim 21, wherein each of the first set of frequency elements and the second set of frequency elements comprises inconsecutive frequency elements.

23. The apparatus of claim 21, wherein each of the first set of frequency elements and the second set of frequency elements comprises consecutive frequency elements.

24. An apparatus for receiving an uplink pilot in a frequency division multiple access system, the apparatus comprising:
a divider for receiving a signal of one time slot including data symbol intervals and inconsecutive first and second pilot symbol intervals which have a shorter length than the data symbol intervals, distinguishing the received signal for each frequency element, and dividing the received signal into data symbols of the data symbol intervals and pilot symbols of the first pilot symbol interval and the second pilot symbol interval;
a channel estimator for performing channel estimation using the pilot symbols;
an equalizer for channel-compensating the data symbols using channel estimated values from the channel estimator;
a demodulator for Orthogonal Frequency Division Multiplexing (OFDM)-demodulating the channel-compensated data symbols; and
a constellation-to-bit mapper for converting the demodulated signal into a bit stream,
wherein the data symbols for terminals are mapped to given frequency elements in the data symbol intervals, first pilot symbols for a first terminal among the pilot symbols are mapped to a first set of frequency elements in the first pilot symbol interval, and second pilot symbols for a second terminal among the pilot symbols are mapped to a second set of frequency elements in the second pilot symbol interval,
wherein a length of each of the data symbol intervals, a length of the first pilot symbol interval, and a length of the second pilot symbol interval are determined according to a number of samples, and
wherein a sample is a basic time unit constituting the data symbols and the pilot symbols.

25. The apparatus of claim 24, wherein each of the first set of frequency elements and the second set of frequency elements comprises inconsecutive frequency elements.

26. The apparatus of claim 24, wherein each of the first set of frequency elements and the second set of frequency elements comprises consecutive frequency elements.

27. A method for receiving an uplink pilot in a frequency division multiple access system, comprising:
receiving a signal of one time slot including data symbol intervals and inconsecutive first and second pilot symbol intervals which have a shorter length than the data symbol intervals, distinguishing the received signal for each frequency element, and dividing the received signal into data symbols of the data symbol intervals and pilot symbols of the first pilot symbol interval and the second pilot symbol interval;
performing channel estimation in a channel estimator using the pilot symbols;
channel-compensating the data symbols using channel estimated values from the channel estimator;
Orthogonal Frequency Division Multiplexing (OFDM)-demodulating the channel-compensated data symbols; and
converting the demodulated signal into a bit stream;
wherein the data symbols are mapped to given frequency elements in the data symbol intervals, the pilot symbols are mapped to a first set of frequency elements in the first pilot symbol interval, and the pilot symbols are mapped to a second set of frequency elements in the second pilot symbol interval,
wherein a length of each of the data symbol intervals, a length of the first pilot symbol interval, and a length of the second pilot symbol interval are determined according to a number of samples, and
wherein a sample is a basic time unit constituting the data symbols and the pilot symbols.

28. The method of claim 27, wherein each of the first set of frequency elements and the second set of frequency elements comprise inconsecutive frequency elements.

29. The method of claim 27, wherein each of the first set of frequency elements and the second set of frequency elements comprise consecutive frequency elements.

30. A method for receiving an uplink pilot in a frequency division multiple access system, comprising:
receiving a signal of one time slot including data symbol intervals and inconsecutive first and second pilot symbol intervals which have a shorter length than the data symbol intervals, distinguishing the received signal for each frequency element, and dividing the received signal into data symbols of the data symbol intervals and pilot symbols of the first pilot symbol interval and the second pilot symbol interval;
performing channel estimation in a channel estimator using the pilot symbols;
channel-compensating the data symbols using channel estimated values from the channel estimator;

Orthogonal Frequency Division Multiplexing (OFDM)-demodulating the channel-compensated data symbols; and
converting the demodulated signal into a bit stream;
wherein the data symbols for terminals are mapped to given frequency elements in the data symbol intervals, first pilot symbols for a first terminal among the pilot symbols are mapped to a first set of frequency elements in the first pilot symbol interval, and second pilot symbols for a second terminal among the pilot symbols are mapped to a second set of frequency elements in the second pilot symbol interval,
wherein a length of each of the data symbol intervals, a length of the first pilot symbol interval, and a length of the second pilot symbol interval are determined according to a number of samples, and
wherein a sample is a basic time unit constituting the data symbols and the pilot symbols.

31. The method of claim 30, wherein each of the first set of frequency elements and the second set of frequency elements comprise inconsecutive frequency elements.

32. The method of claim 30, wherein each of the first set of frequency elements and the second set of frequency elements comprise consecutive frequency elements.

* * * * *